June 23, 1970     D. G. NEVILLE ET AL     3,516,112
ACOUSTIC DAMPING GLIDE
Filed Feb. 10, 1966
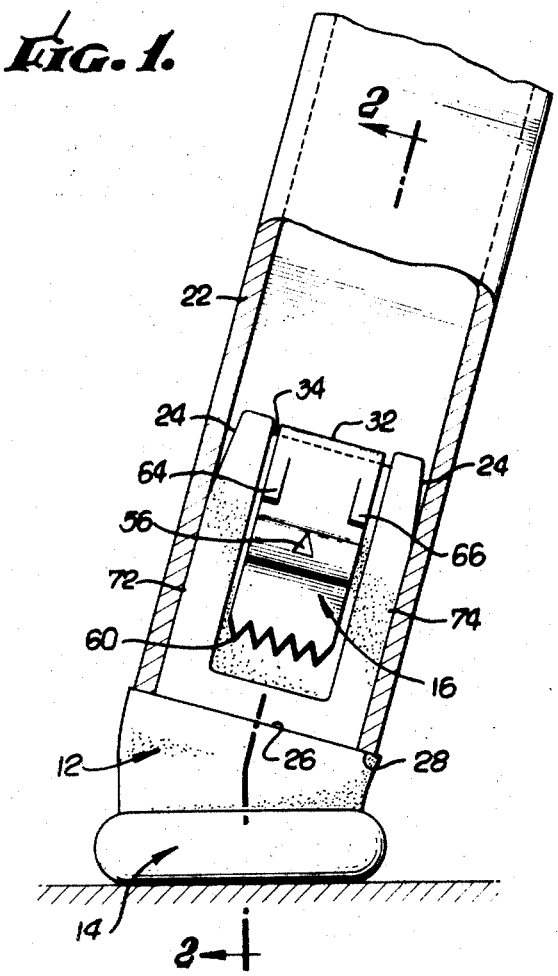
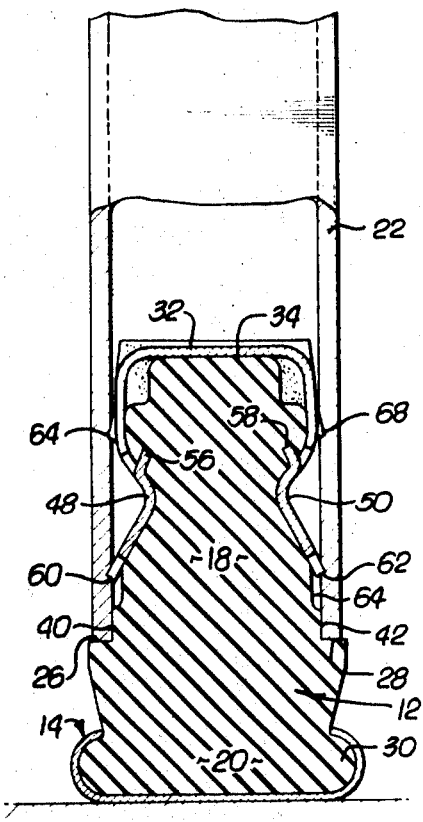
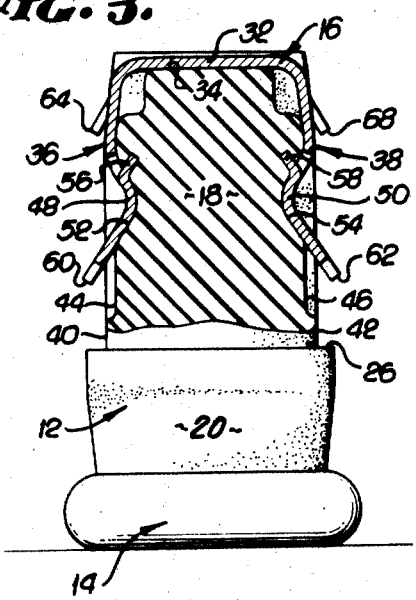
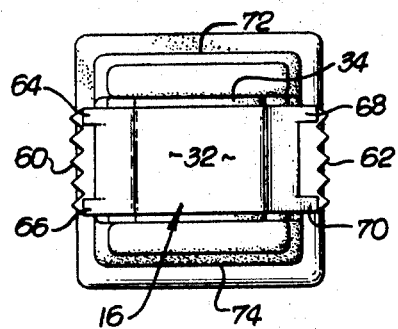
INVENTORS.
DONALD G. NEVILLE
ERNEST J. STRAITS
By Flam and Flam
ATTORNEYS.

United States Patent Office 3,516,112
Patented June 23, 1970

3,516,112
ACOUSTIC DAMPING GLIDE
Donald G. Neville, Los Angeles, Calif., and Ernest J. Straits, St. Charles, Ill., assignors to Plastiglide Mfg. Corp., Santa Monica, Calif.
Filed Feb. 10, 1966, Ser. No. 526,507
Int. Cl. A47b 91/06
U.S. Cl. 16—42                                    39 Claims

ABSTRACT OF THE DISCLOSURE

The acoustic damping glide includes a body made of acoustic damping material having a high bulk modulus of elasticity. The body has an insert part that fits into the end of a tubular furniture leg. The body also has a downwardly projecting base part upon which a cap is mounted. A U-shaped spring-sealed clip has legs that fit the insert part. Insertion of the glide constricts the insert part whereby the side surfaces bulge outwardly firmly to lock the leg whereby the weight is transmitted to the body substantially independently of the shoulder.

BRIEF SUMMARY OF THE INVENTION

This invention relates to furniture glides, and particularly to glides adapted to be inserted into hollow legs that are angled with respect to the horizontal supporting plane.

Various glides have been proposed for such purposes, including swivel glides and unitary molded plastic glides. Such glides, however, are quite noisy by virtue of the acoustic coupling between the furniture leg and the floor-contacting part of the glide. It has been suggested to provide rubber or rubber-like materials between the leg-gripping and floor-contacting parts of the glide. Yet if reliance is placed solely on the rubber material for structural connection between these parts, the high load on the rubber, due to the angularity of the leg, results in the rubber either being pulled loose from the leg or shearing. Consequently, glides of this type incorporating rubber-like acoustic damping material ordinarily include some additional structural element that detracts from the desired acoustic damping feature.

The primary object of this invention is to provide an acoustic damping glide insertible in an angled furniture leg, and having sufficient structural connection with the leg to ensure against its being pulled loose or from being sheared off, and in which rubber-like material provides the only structural connection between the floor-contacting part of the glide and the furniture leg.

Another object of this invention is to provide a glide of this character made of three simple parts, namely, a molded rubber-like body, a floor-contacting cap, and a connector clip.

Another object of this invention is to provide a glide of this character in which the clip causes the body to expand and effectively lock the hollow leg. For this purpose, the body material, while flexible, nevertheless has a very high bulk modulus of elasticity whereby any constriction must be accompanied by a corresponding expansion at another portion of the body.

Another object of this invention is to provide a glide of this character that by simple means forms a protective bumper about the end of the furniture leg.

This invention possesses many other advantages, and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention; but it is to be understood that this detailed description is not to be taken in a limiting sense, since the scope of this invention is best defined by the appended claims.

BRIEF DESCRIPTION OF THE DRAWINGS

FIG. 1 is a side elevational view of an acoustic damping glide incorporating the present invention, and shown installed in the lower open end of a tubular leg, the leg being broken away and shown in section;

FIG. 2 is a sectional view taken along a plane corresponding to line 2—2 of FIG. 1;

FIG. 3 is a front elevational view of the glide shown prior to installation, its upper portion being shown in section; and FIG. 4 is a top plan view of the glide shown in FIG. 3.

DETAILED DESCRIPTION

The glide comprises three parts: a resilient body 12, a floor-contacting cap 14, and a pressure member in the form of a connector clip 16. The body 12 has an upper insert part 18 and a lower base part 20. The insert part 18, in this instance, is square in cross-section to conform to the configuration of a tubular furniture leg 22 in which it is accommodated. Each of the four sides of the insert part 18 is bevelled, as at 24, to facilitate insertion. The juncture between the upper insert part 18 and the lower base part 20 is defined by an upwardly extending shoulder 26 that in assembled position abuts the lower edges 28 of the leg 22.

The cap 14, made of stainless steel or the like, is connected to the base part by having its rim swedged over a bulbous flange 30 at the end of the base part 20. Optionally, the cap 14 may define one boundary of a cavity in which the body 12 is cast.

The plane of the shoulder 26 is angled relative to the cap 14 to compensate for the angularity of the leg 22.

The body 12 is made of moldable rubber or rubber-like material having characteristics of high tensile strength and high bulk modulus of elasticity. Only a small part of the load imposed upon the glide is borne by the shoulder 26. The upper insert part 18 is firmly locked to the leg 22 so that most of the load is transmitted through the center of the body. The clip 16 accomplishes this function by constricting the insert part 18. Thus the clip 16 applies pressure to the two opposite surfaces of the body to squeeze them together; since the body 12 is made of material having a high bulk modulus of elasticity, the quadrature surfaces are caused correspondingly to expand outwardly and firmly grip the leg 22.

The clip 16, made of spring steel or other suitable resilient material, is substantially of inverted U shape. Its connecting portion 32 fits in a shallow groove 34 formed across the top of the insert part 18. Two symmetrical legs 36 and 38 (FIG. 3) extend downwardly along two side surfaces 40 and 42 of the insert part 18. These surfaces 40 and 42 have shallow grooves 44 and 46 adjoining ends of the top groove 34 and in which the upper parts of the legs 36 and 38 are recessed. The central portions of the legs 36 and 38 are inwardly bowed, as at 48 and 50, and closely fit arcuate cavities 52 and 54 extending inwardly from the grooves 44 and 46, respectively. Upwardly extending prongs 56 and 58, struck inwardly from the legs, slightly penetrate the insert part 18 and hold the clip 16 and the body 12 in assembled relationship.

The lower terminal portions of the legs 36 and 38 flare outwardly beyond the side surfaces 40 and 42 and terminate in a series of sharp projections 60 and 62 (see also FIGS. 1 and 4). Each leg 36 and 38 also has a pair of projections 64, 66 and 68, 70 (see also FIG. 4) located at the sides of the upper parts of the legs that project outwardly beyond the bounding planes of the side surfaces 40 and 42.

When the upper body part 18 is inserted into the leg 22, the lower edge 28 of the leg 22 engages the trailing parts of the projections 60, 62, 64, 66, 68 and 70, thus guiding them inwardly, and flexing the clip.

Since the inwardly bowed parts 48 and 50 closely fit the insert part 18, the opposite side surfaces 72 and 74 are bulged outwardly and firmly grip the leg 22. Furthermore, the projections 60 and 62 bite into the leg 22 and firmly lock the clip against movement outwardly of the leg. Since the upper insert part 18 interlocks the clip, particularly about the inwardly bowed portions 48 and 50, the body part 12 is likewise held against removal. The projections 64, 66, 68 and 79 likewise bite into the leg 22 and cooperate with the prongs 60 and 62 to prevent the glide from being rocked and thus removed by a series of successive minute movements.

Since the leg 22 is connected to the cap 14 solely by the body 12 which has suitable acoustic damping characteristics, the glide is extremely quiet. Moreover, since the quadrature surfaces 72 and 74 are locked to the leg 22, substantially the entire load is carried through the body of the glide rather than through the shoulder 26, and there is very little tendency for the glide to shear.

As shown in FIGS. 1 and 2, the shoulder 26 projects laterally slightly beyond the leg 22. A peripheral bumper is thus formed that shields the sharp corners of the lower edges 28. These edges might otherwise cause damage when the furniture article is moved about.

Of course, the angularity of the upper insert part 18 relative to the base part 20 can be varied in accordance with the design of the particular furniture article.

The inventors claim:

1. In an acoustic damping glide: a body made of acoustic damping material having a high bulk modulus of elasticity, and having an insert part designed to fit into an end recess in a hollow furniture leg, and having a base part designed to project beyond the furniture leg; said parts being of one piece of said body; pressure means designed to be interposed and to react between the interior surface of the furniture leg recess and at least one of the side surfaces of the body for constricting the body thus to expand the other side surfaces of the body into firm frictional engagement with the furniture leg recess independently of the weight load on said body; the said insert part being arranged such that a substantial part of the weight load on said base part is transmitted to said furniture leg through said insert part.

2. The glide as set forth in claim 1 in which said pressure means terminates above said base part to be entirely concealed within said furniture leg.

3. The glide as set forth in claim 1 which said pressure means includes gripping prongs for biting into the furniture leg to prevent the removal of the pressure means.

4. The combination as set forth in claim 1 in which said base part has a portion enlarged adjacent the place of emergence of said body from said leg to form a bumper shielding the end of said furniture leg.

5. The glide as set forth in claim 1 in which said base part and said insert part are angled with respect to each other to compensate for the angularity of said furniture leg.

6. The glide as set forth in claim 5 in which an upwardly extending shoulder defines the juncture between said insert part and said base part, said shoulder being designed to fit about the edges of said leg recess for limiting inward movement of said body.

7. The glide as set forth in claim 1 in which an upwardly extending shoulder defines the juncture between said insert part and said base part, said shoulder being designed to fit about the edges of said leg recess for limiting inward movement of said body.

8. The glide as set forth in claim 1 in which said pressure means comprises an inverted U-shaped clip encompassing the upper end of said insert part, with its legs extending along two sides of said insert part, the other sides of said insert part being exposed to the inside surface of said hollow leg, the end edges of said legs having a plurality of gripping prongs, said clip legs also having gripping prongs located adjacent the proximal ends of said legs for stabilizing said pressure means against rocking movement.

9. The glide as set forth in claim 8 in which said pressure means and said insert part have correspondingly curved parts for preventing relative separation of the pressure means and the body by relative movement in opposite directions extending longitudinally of said insert part.

10. The glide as set forth in claim 1 in which said pressure means and said insert part have correspondingly curved parts for preventing relative separation of the pressure means and the body by relative movement in a direction extending longitudinally of said insert part.

11. The glide as set forth in claim 10 in which said pressure means includes a part inclined downwardly and outwardly to be engaged by the edge of the hollow furniture leg whereby the said pressure means automatically applies pressure to said insert part as the glide and pressure means are inserted into said hollow furniture leg.

12. The glide as set forth in claim 1 together with a floor-contacting cap secured to the end of said base part and having an extent terminating short of said insert part to be isolated from said leg by the acoustic damping material of said body.

13. The glide as set forth in claim 12 in which said base part and said insert part are angled with respect to each other to compensate for the angularity of said furniture leg.

14. In an acoustic damping glide: a body made of acoustic damping material having a high bulk modulus of elasticity, and having an insert part of substantially rectangular cross-sectional configuration to fit within a corresponding hollow furniture leg; said body having a base part designed to project beyond the furniture leg; said parts being of one piece of said body; a connector clip made of resilient material, and of substantially inverted U shape, said clip having a connecting portion extending across the inner end of said insert part, and legs extending along opposite side surfaces of said insert part, said legs having parts projecting laterally beyond the said opposite side surfaces whereby the clip legs are flexed towards each other when installed in said hollow leg for constricting the body thus to expand the other side surfaces of the body into firm frictional engagement with the furniture leg; said insert part being arranged such that a substantial part of the weight load on said base part is transmitted to said furniture leg through said insert part.

15. The glide as set forth in claim 14 in which said base part and said insert part are angled with respect to each other to compensate for the angularity of said furniture leg.

16. The glide as set forth in claim 15 in which said base part is provided with an upwardly extending shoulder limiting inward movement of the body.

17. The glide as set forth in claim 14 in which said base part is provided with an upwardly extending shoulder limiting inward movement of the body.

18. The glide as set forth in claim 14 together with a floor-contacting cap secured to the end of said base part and having an extent terminating short of said insert part to be isolated from said furniture leg by the acoustic damping material of said body; the connection between said cap and said clip being serially dependent upon said body of acoustic damping material.

19. The glide as set forth in claim 18 in which said base part and said insert part are angled with respect to each other to compensate for the angularity of said furniture leg.

20. The glide as set forth in claim 14 in which said laterally projecting parts comprise the terminal portions of the legs, each of said terminal portions being inclined downwardly and outwardly to be engaged by the edge of said hollow furniture leg whereby said clip legs are automatically flexed towards each other as the glide is installed.

21. The glide as set forth in claim 20 in which said terminal portions of each of said legs is provided with a plurality of sharp prongs to bite into the furniture leg to prevent removal of the connector clip.

22. The glide as set forth in claim 21 in which said legs each have at their upper portions, a pair of laterally spaced outwardly extending prongs for biting into said furniture leg, said prongs stabilizing said connector clip against rocking movement.

23. The glide as set forth in claim 22 in which said base part and said insert part are angled with respect to each other to compensate for the angularity of said furniture leg.

24. The glide as set forth in claim 22 together with a floor-contacting cap secured to the end of said base part and having an extent terminating short of said insert part to be isolated from said furniture leg by the acoustic damping material of said body; the connection between said cap and said clip being serially dependent upon said body of acoustic damping material.

25. The glide as set forth in claim 21 in which said clip legs have inwardly bowed intermediate portions and in which said opposed side surfaces of said insert part have correspondingly curved cavities for fitting said bowed portions for preventing relative separation of the clip and the body by relative movement in opposite directions extending longitudinally of the body.

26. The glide as set forth in claim 25 in which said legs each have at their upper portions, a pair of laterally spaced outwardly extending prongs for biting into said furniture leg, said prongs stabilizing said connector clip against rocking movement.

27. The glide as set forth in claim 25 together with a floor-contacting cap secured to the end of said base part and having an extent terminating short of said insert part to be isolated from said furniture leg by the acoustic damping material of said body; the connection between said cap and said clip being serially dependent upon said body of acoustic damping material.

28. The glide as set forth in claim 14 in which said clip legs terminate above said base part to be entirely concealed within said furniture leg.

29. The glide as set forth in claim 28 together with a floor-contacting cap secured to the end of said base part and having an extent terminating short of said insert part to be isolated from said furniture leg by the acoustic damping material of said body; the connection between said cap and said clip being serially dependent upon said body of acoustic damping material.

30. In combination: a furniture leg having an opening at its lower end, there being a recess extending inwardly of said opening of substantially uniform cross-sectional configuration; a glide body made of acoustic damping material having a high bulk modulus of elasticity, having an insert part fitting said leg recess and having a base part projecting beyond said furniture leg end; said parts being of one piece of said body; pressure means interposed and reacting between the interior surface of said recess and at least one of the side surfaces of the body for constricting the body thus to expand the other side surfaces of the body into firm frictional engagement with the leg recess independently of the weight load on said body; the said insert part being arranged such that a substantial part of the weight load on said base part is transmitted to said furniture leg through said insert part.

31. The combination as set forth in claim 30 in which said pressure means terminates above said base part to be entirely concealed within said furniture leg.

32. The combination as set forth in claim 30 together with a floor-contacting cap secured to the end of said base part and having an extent terminating short of said insert part to be isolated from said leg by the acoustic damping material of said body.

33. The combination as set forth in claim 30 in which said base part and said insert part are angled with respect to each other to compensate for the angularity of said furniture leg.

34. The combination as set forth in claim 30 in which an upwardly extending shoulder defines the juncture between said insert part and said base part, said shoulder being designed to fit about the edges of said leg recess for limiting inward movement of said body.

35. The combination as set forth in claim 30 in which said pressure means includes gripping prongs for biting into the furniture leg to prevent the removal of the pressure means.

36. The combination as set forth in claim 35 in which said gripping prongs are located at least at three non-aligned places for stabilizing said pressure means against rocking movement.

37. The combination as set forth in claim 35 in which said pressure means and said insert part have correspondingly curved parts for preventing relative separation of the pressure means and the body by relative movement in opposite directions extending longitudinally of said insert part.

38. The combination as set forth in claim 30 in which said pressure means and said insert part have correspondingly curved parts for preventing relative separation of the pressure means and the body by relative movement in opposite directions extending longitudinally of said insert part.

39. The combination as set forth in claim 38 in which said pressure means includes a part inclined downwardly and outwardly to be engaged by the edge of the hollow furniture leg whereby the said pressure means automatically applies pressure to said insert part as the glide and pressure means are inserted into said hollow furniture leg.

References Cited

UNITED STATES PATENTS

| | | | |
|---|---|---|---|
| 2,618,009 | 11/1952 | Tinnerman | 287—126 |
| 2,631,330 | 3/1953 | Becker | 16—42 |
| 2,458,621 | 1/1949 | Miller. | |
| 2,295,444 | 9/1942 | Woodward. | |

BOBBY R. GAY, Primary Examiner

D. L. TROUTMAN, Assistant Examiner